Sept. 1, 1931.   J. QUAAS   1,821,816

DEVICE FOR PREVENTING SIDE SLIPS IN MOTOR VEHICLES AND THE LIKE

Filed Oct. 22, 1928

Inventor:
J. Quaas

Patented Sept. 1, 1931

1,821,816

UNITED STATES PATENT OFFICE

JOHANNES QUAAS, OF ERFURT, GERMANY, ASSIGNOR TO HANS PRINZ, OF ERFURT, GERMANY

DEVICE FOR PREVENTING SIDE SLIPS IN MOTOR VEHICLES AND THE LIKE

Application filed October 22, 1928, Serial No. 314,295, and in Germany October 28, 1927.

The invention relates to a device for preventing motor vehicles from side slipping under the influence of centrifugal force. In the case of motor cars, such dangerous side slip occurs in driving round curves, especially in wet weather. Devices for preventing this are already known, for example, which enable the centre of gravity of the car to be lowered, or counteract the tendency to slip by bringing auxiliary wheels or the like into operation. These known devices necessitate the driver performing manipulations—either prior to or during the passage round the bend, in each case—which entail considerable driving skill and foresight, but they do not represent any automatic and reliable means of safety for the vehicle, especially when the driver cannot foresee the danger.

The invention is designed to prevent side slip on bends, and also any accidental and unanticipated side slip of the car, by means of a force which acts automatically and becomes the more efficacious the more sudden and powerful the centrifugal movement to be counteracted.

According to the invention, this force is derived from the inertia of a suitably weighted pendulum, or double pendulum, which is mounted, so as to pivot in a horizontal plane, parallel with the central longitudinal axis of the car, in such a manner that, in obedience to the law of inertia, it is able to maintain its direction when, for example, the front part of the car turns to the left or the right in running round a curve. This force of inertia of the pendulum sets up an angular displacement of the central axis in a direction opposite to that of the side slip; and this force, being transmitted by suitable intermediate members, is intended to oppose the action of the slipping portion of the vehicle automatically, that is to say, prevent the side slip by an oppositely directed force.

A typical embodiment of the invention is illustrated in the drawings, in which Figure 1 is a diagrammatic side elevation of a car frame, with a double pendulum, in section through the suspension of said double pendulum.

Figure 1:
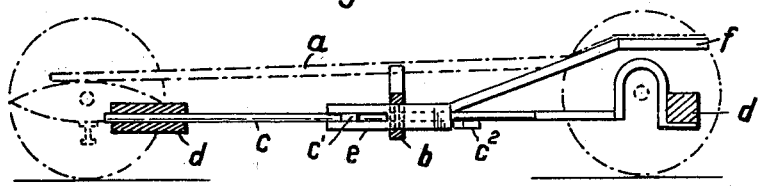
Figure 2:
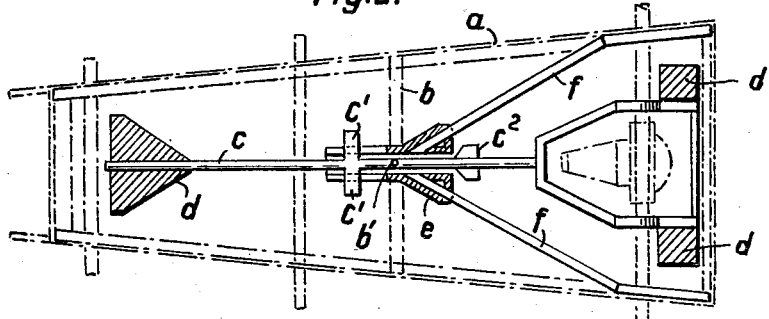
Figure 2 is a plan of the above, in partial section.
Figure 3:
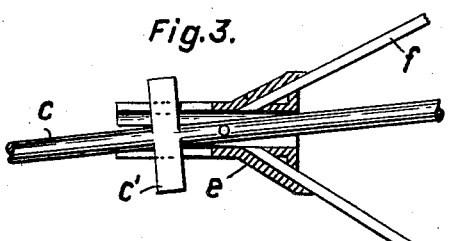
Figure 3 is a section through the mounting of the horizontally pivotable pendulum.
Figure 4:
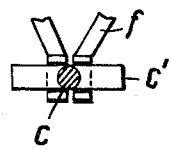
Figures 4 is a section through the pendulum, viewed from the front end of the car.

According to the drawings there is mounted in the chassis frame $a$ of a motor car, a horizontally pivotable pendulum (a double pendulum in the embodiment according to Figures 1 and 2). This pendulum consists of a rod $c$ which rests in a cross stay $b$ and is adapted to be loaded at the ends by weights $d$. This rod $c$ is pivotally mounted on the pin $b^1$ parallel to the longitudinal axis of the car frame. In the embodiment shown, it is passed loosely between a kind of two jaws or cheeks $c$, which are mounted in the stay $b$, and is adapted to guide itself in slots, for example by means of the lugs $c^1$. Lugs $c^2$ may bear against the rear end of the jaws. The sole essential point, however, is that, owing to its method of mounting—which may be effected in other ways—the pendulum rod $c$ is afforded the possibility of pivoting in relation to the car frame. In the rearward portion of the frame $a$ and—as shown in the drawings—as near to the back axle as possible, two stays $f$ are secured which lead to the pendulum rod, or grip this like two bearings or jaws and thus, to some extent, themselves constitute the jaws or cheeks (Figures 2—4). The rod $c$ may be hollow or formed of solid material. It may be constructed of specifically heavy metal, or of light metal, and be loaded at the free ends. As already stated above and shown in Fig. 6 the same inventional idea can be carried out with a simple pendulum, which must be mounted in a corresponding manner. The weight $d$ is mounted on the longer part of the rod $c$ pivotally mounted on the pin $b^1$, the other end of the rod $e$ being secured to the stays $f$.

Figure 5:
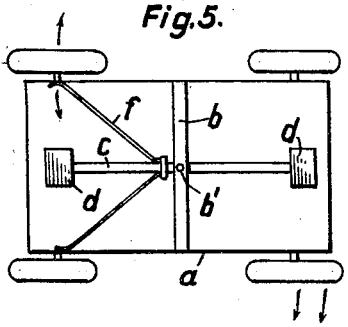
Figures 5 and 6 are diagrammatic representations of the mounting of the pendulum and double pendulum, and the action in the case of a side slip.
Figure 6:
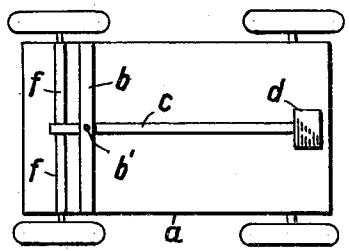

The working of the devices can be gathered from the description and more particularly from Figures 5 and 6. Assuming that a double pendulum is mounted in the frame, and that the car is being steered round a right-hand curve. In such case, experience shows that the rear end of the car tends to side-slip in the opposite direction. Owing to its inertia, the double pendulum, however, remains in the previous direction of the central axis, and, through the stays or equivalent connecting means, opposes this slip of the rear portion of the car. It follows therefore that it is advantageous to allow the counter force, due to the inertia of the pendulum, to act close to the back axle. From the foregoing it is also evident that the angular adjustment will be the greater in proportion to the suddenness and sharpness of the curve, and that the counter force opposing the slip will consequently also be the greater. By suitably arranging the connecting stays and selecting a corresponding ratio of transmission, a possibility is afforded of increasing or decreasing said force and to bring it into a definite relation to the weight of the rear portion of the vehicle and its load. Even when running in the straight, when the car is not travelling round a curve, the weight and inertia of the pendulum contribute substantially to stabilize the straight running of the vehicle. Owing to the automatic action of the pendulum, accidents may often be avoided, as has been proved.

The stays $f$ shall lead to the pendulum rod and grip them at a short distance from the pin $b^1$. In the place of the stays $f$ other means for example rope joint can be used, whereby in the place of the stays $f$, ropes, cables, belts or chains are guided on pulleys, rollers or drums, which are mounted in the frame of the vehicle. In travelling curves or when the front portion of the car or the like deviates towards one side or the other the cables exert a tension on the rear portion of the car frame and thereby prevent centrifugal side slip of this rear portion.

I claim:—

1. A device for preventing side slip in motor vehicles and the like, comprising a pivot arranged substantially perpendicularly to the vehicle frame, means for connecting said pivot with the vehicle frame and a pendulum loaded at both ends, mounted on said pivot and adapted by means of its inertia to counteract a centrifugal side slip of the rear portion of the vehicle.

2. A device for preventing side slip in motor vehicles and the like, comprising a pivot arranged substantially perpendicularly to the vehicle frame, means for connecting said pivot with the vehicle frame, a pendulum loaded at both ends, mounted on said pivot and adapted to swing substantially parallel with the plane of said frame and other means for automatically transmitting the forces generated by the inertia of the pendulum to the rear portion of the vehicle, when such vehicle is turned out of its normal direction of travel.

3. A device for preventing side slip in motor vehicles and the like, comprising a pendulum adapted to swing freely within a predetermined angle in a plane substantially parallel to the plane of the vehicle frame and a pivoted connection between said pendulum and the vehicle.

4. A device for preventing side slip in motor vehicles and the like, comprising a pendulum adapted to swing freely within a predetermined angle in a plane substantially parallel to the plane of the vehicle frame, a pivoted connection between said pendulum and the vehicle and means for automatically transmitting the forces generated by the inertia of the pendulum to the rear portion of the vehicle, when such vehicle is turned out of its normal direction of travel.

In testimony whereof I affix my signature.

JOHANNES QUAAS.